(12) United States Patent
Marukawa et al.

(10) Patent No.: US 10,571,247 B2
(45) Date of Patent: Feb. 25, 2020

(54) SENSOR HEAD FOR POSITIONING SENSOR

(71) Applicant: OMRON Corporation, Kyoto (JP)

(72) Inventors: Mariko Marukawa, Kyoto (JP); Takahiro Okuda, Kyoto (JP); Kosuke Sugiyama, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/276,580

(22) Filed: Feb. 14, 2019

(65) Prior Publication Data
US 2019/0285399 A1    Sep. 19, 2019

(30) Foreign Application Priority Data

Mar. 15, 2018   (JP) ................................ 2018-047887

(51) Int. Cl.
*G01B 11/02*   (2006.01)
*G02B 21/00*   (2006.01)
(Continued)

(52) U.S. Cl.
CPC ........ *G01B 11/026* (2013.01); *G01B 11/0608* (2013.01); *G02B 7/02* (2013.01);
(Continued)

(58) Field of Classification Search
CPC ...... G01B 2210/50; G01B 9/04; G01B 11/00; G01B 11/002; G01B 11/14; G01B 11/22; G01B 11/24; G01B 11/026; G01B 11/0608; G02B 7/003; G02B 7/008; G02B 7/02; G02B 7/021; G02B 7/023; G02B 7/026; G02B 7/18; G02B 7/1805; G02B 7/181;
(Continued)

(56) References Cited

U.S. PATENT DOCUMENTS 4,146,296 A * 3/1979 Mandlak ................ G02B 23/02
                                                    359/434
5,260,965 A * 11/1993 Nakazeki ............ B23K 26/032
                                                    372/108
(Continued)

FOREIGN PATENT DOCUMENTS

EP         2902829            8/2015
EP         2902829 A1 *       8/2015       ............ G02B 7/007
(Continued)

OTHER PUBLICATIONS

Abstract and Figure of CN 206193319 U published on May 24, 2017. (Year: 2017).*
(Continued)

*Primary Examiner* — Gordon J Stock, Jr.
(74) *Attorney, Agent, or Firm* — JCIPRNET (57) ABSTRACT

Provided is a sensor head capable of reduction in size while securing measurement accuracy. A sensor head includes a first case section and a second case section each having a substantially cylindrical shape and an end portion of which is open, and a third case section configured to connect the first case section and the second case section, a diffraction lens is disposed in the first case section, an objective lens is disposed in the second case section, and a mirror member is disposed in the third case section and configured to bend light entering the diffraction lens side toward the objective lens side.

9 Claims, 6 Drawing Sheets (51) Int. Cl.
    *G01B 11/06*     (2006.01)
    *G02B 7/02*     (2006.01)
    *G02B 7/18*     (2006.01)

(52) U.S. Cl.
    CPC ........... *G02B 7/18* (2013.01); *G02B 21/0024* (2013.01); *G01B 2210/50* (2013.01)

(58) Field of Classification Search
    CPC ........ G02B 7/182; G02B 7/1822; G02B 7/20; G02B 21/0024; G01D 5/268
    See application file for complete search history.

(56) References Cited

U.S. PATENT DOCUMENTS

| | | | | |
|---|---|---|---|---|
| 5,446,565 A * | 8/1995 | Komma | ................... | G02B 3/10 369/103 |
| 5,455,677 A * | 10/1995 | Yoshizumi | ............ | G01B 11/00 33/561 |
| 5,954,634 A * | 9/1999 | Igarashi | ................. | A61B 1/055 600/109 |
| 6,560,188 B1 * | 5/2003 | Kyoya | ................. | G11B 7/1275 369/112.03 |
| 6,834,036 B1 * | 12/2004 | Shiono | ................... | G11B 7/123 369/112.03 |
| 7,477,401 B2 * | 1/2009 | Marx | ................. | G01B 11/0608 356/609 |
| 7,532,418 B2 * | 5/2009 | Teramoto | ............... | G02B 7/102 359/811 |
| 7,548,381 B2 * | 6/2009 | Chen | ................. | G02B 13/0065 359/694 |
| 8,194,251 B2 * | 6/2012 | Emtman | ................ | G01B 11/14 356/3 |
| 8,325,581 B2 * | 12/2012 | Yamasaki | ............ | G11B 7/0956 369/112.08 |
| 8,983,581 B2 * | 3/2015 | Bawendi | .............. | A61B 5/0071 382/128 |
| 9,778,165 B2 * | 10/2017 | van den Engh | ....... | G01N 21/05 |
| 10,197,382 B2 * | 2/2019 | Matsumiya | .......... | G01B 11/002 |
| 10,274,309 B2 * | 4/2019 | Marukawa | ............. | G01B 11/14 |
| 10,379,312 B2 * | 8/2019 | Hirth | | |
| 2007/0035855 A1 * | 2/2007 | Dickensheets | ....... | A61B 5/0068 359/819 |
| 2007/0081236 A1 * | 4/2007 | Tearney | ............... | A61B 5/0062 359/390 |
| 2008/0170243 A1 | 7/2008 | Nomaru | | |
| 2010/0294949 A1 * | 11/2010 | Sasaki | ................ | G02B 21/0076 250/458.1 |
| 2011/0304927 A1 * | 12/2011 | Margolis | ................ | G02B 15/15 359/744 |
| 2012/0062723 A1 * | 3/2012 | Ghosh | .................... | G02B 21/16 348/79 |
| 2016/0169660 A1 * | 6/2016 | Shafer | .................. | G01B 11/005 356/326 |
| 2018/0274903 A1 * | 9/2018 | Kuga | ................. | G01B 11/0608 |
| 2018/0356207 A1 * | 12/2018 | Takei | ................... | G01B 11/026 |
| 2019/0101374 A1 * | 4/2019 | Marukawa | .......... | G01B 11/026 |

FOREIGN PATENT DOCUMENTS

| | | |
|---|---|---|
| JP | 04350607 A * | 12/1992 |
| JP | 2012-208102 | 10/2012 |
| JP | 2015-143652 | 8/2015 |
| JP | 2017116493 | 6/2017 |
| TW | I584009 | 5/2017 |

OTHER PUBLICATIONS

"Office Action of Taiwan Counterpart Application," with English translation thereof, dated Nov. 5, 2019, p. 1-p. 10.
"Search Report of Europe Counterpart Application", dated Sep. 3, 2019, p. 1-p. 5.

* cited by examiner

SENSOR HEAD FOR POSITIONING SENSOR

CROSS-REFERENCE TO RELATED APPLICATION

This application claims the priority benefit of Japanese application serial no. 2018-047887, filed on Mar. 15, 2018. The entirety of the above-mentioned patent application is hereby incorporated by reference herein and made a part of this specification.

BACKGROUND

Technical Field

The disclosure relates to a sensor head.

Description of Related Art

Confocal measurement devices using confocal optical systems as apparatuses for measuring the positions of measurements without coming into contact with the measurement objects have become widespread.

For example, a confocal measurement device disclosed in Patent Document 1 uses a confocal optical system having a diffraction lens disposed between a light source and a measurement object. Light emitted toward the measurement object is focused at a distance according to a wavelength thereof. The measurement device can measure a position of the measurement object on the basis of a peak of a wavelength of light reflected by the measurement object.

In such a measurement device, an instrument referred to as "a sensor head" or the like is disposed toward the measurement object, and light is emitted from the sensor head to the measurement object. The sensor head has a case in which a space serving as an optical path is formed, and parts that constitute the confocal optical system may be accommodated in the space.

In recent years, due to the demand for space saving and compactness for the sensor head, the case has tended to have become increasingly reduced in size. In order to achieve reduction in size, for example, a configuration in which a length of a sensor head is reduced in a direction along an optical axis thereof has been disclosed in Patent Document 2.

In Patent Document 2, the sensor head has a bent shape, and an optical axis in the sensor head is bent. Since the optical axis is bent in this way, even though a length of the sensor head in a longitudinal direction is reduced, the length for an optical path space through which light in the sensor head passes can be secured.

Incidentally, in the sensor head disclosed in Patent Document 2, when seen in a direction along an optical axis (hereinafter, a case when seen in this direction is referred to as "when seen in an optical axis direction"), while a lens has a substantially circular shape, each case section has a substantially quadrangular shape. Four corners of the case section are used as spaces in which screw holes are formed.

In a sensor head having a substantially quadrangular shape, when seen in the optical axis direction, since the four corners of the case section overhang outward further than the lens, the sensor head may have an increased size. As a method of curtailing this increase in size of the sensor head, using a small lens may be conceived. However, when an effective diameter of the lens is reduced according to reduction in size of the lens, a decrease in measurement accuracy may occur.

PATENT DOCUMENTS

[Patent Document 1] Japanese Laid-open No. 2012-208102
[Patent Document 2] Japanese Laid-open No. 2015-143652

SUMMARY

A sensor head according to an aspect of the disclosure is a sensor head of a sensor configured to measure a position of a measurement object, the sensor head including: a diffraction lens configured to emit light entering from a light source side along an optical axis and generate chromatic aberration with respect to the light; an objective lens disposed closer to the measurement object side than the diffraction lens is, and configured to collect light entering from the diffraction lens side to emit the light toward the measurement object side and emit the light entering from the measurement object side toward the diffraction lens side; and a case having a space formed therein and configured to accommodate at least the diffraction lens and the objective lens in the space, wherein the case has a first case section having a substantially cylindrical shape about the optical axis as a central axis and an end portion of which is open, a second case section having a substantially cylindrical shape and an end portion of which is open, and a third case section connected between the first case section and the second case section, the first case section has a diffraction lens disposed therein, the second case section has an objective lens disposed therein, and the third case section has a mirror member disposed therein and configured to bend light entering from the diffraction lens side toward the objective lens side.

DESCRIPTION OF THE EMBODIMENTS

Here, the embodiments of the disclosure are directed to providing a sensor head that enables reduction in size while securing measurement accuracy.

A sensor head according to an aspect of the disclosure is a sensor head of a sensor configured to measure a position of a measurement object, the sensor head including: a diffraction lens configured to emit light entering from a light source side along an optical axis and generate chromatic aberration with respect to the light; an objective lens disposed closer to the measurement object side than the diffraction lens is, and configured to collect light entering from the diffraction lens side to emit the light toward the measurement object side and emit the light entering from the measurement object side toward the diffraction lens side; and a case having a space formed therein and configured to accommodate at least the diffraction lens and the objective lens in the space, wherein the case has a first case section having a substantially cylindrical shape about the optical axis as a central axis and an end portion of which is open, a second case section having a substantially cylindrical shape and an end portion of which is open, and a third case section connected between the first case section and the second case section, the first case section has a diffraction lens disposed therein, the second case section has an objective lens disposed therein, and the third case section has a mirror member disposed therein and configured to bend light entering from the diffraction lens side toward the objective lens side.

According to the aspect, the case has the first case section, the second case section and the third case section. The diffraction lens is disposed in the first case section, and the objective lens is disposed in the second case section. The first case section and the second case section each have a substantially cylindrical shape, and the third case section connects the first case section and the second case section. The third case section has a mirror member disposed therein and configured to bend light entering from the diffraction lens side toward the objective lens side. Since the third case section in which such a mirror member is disposed is provided, a length of the sensor head in a longitudinal direction (a length of the sensor head in a direction along an optical axis of the first case section) can be minimized while securing a length of an optical path space through which light in the sensor head passes. In addition, since the first case section and the second case section each have a substantially cylindrical shape, for example, in comparison with the configuration in which the case section is a substantially rectangular parallelepiped shape, an increase in size of the case section can be minimized because four corners of the case section do not overhang outward from the lens. As a result, reduction in size of the case can be achieved while securing measurement accuracy.

In the aspect, the mirror member may bend light entering from the diffraction lens side toward the objective lens side at a substantially right angle, and bend light entering from the measurement object side toward the diffraction lens side at a substantially right angle.

According to the aspect, since the light entering from the diffraction lens side and the light entering from the measurement object side are bent at a substantially right angle, in comparison with the configuration in which light passing through the sensor head is not bent, an axial length of the second case section of the sensor head can be minimized.

In the aspect, the third case section may have an angled external form.

According to the aspect, since the third case section has an angled external form, positional adjustment of the mirror member disposed in the third case section can be facilitated.

In the aspect, the third case section may have a communication path having a shape bent therein, and the communication path may bring the inside of the first case section and the inside of the second case section in communication with each other.

According to the aspect, the inside of the first case section and the inside of the second case section can be connected via a communication path configured to bring the inside of the first case section and the inside of the second case section in communication with each other.

In the aspect, the third case section may have a first passage disposed in the first case section side and having a substantially cylindrical shape about an optical axis of the first case section as a central axis, and a connecting member configured to connect one end portion of the first passage and one end portion of the first case section may be provided.

According to the aspect, the third case section and the first case section can be connected by the connecting member configured to connect one end portion of the first passage and one end portion of the first case section.

In the aspect, the connecting member may have a substantially annular shape, and one end side of the connecting member may be disposed along an inner circumferential surface of the first passage, and the other end side of the connecting member may be disposed along an inner circumferential surface of the first case section.

According to the aspect, since the third case section and the first case section are connected by the connecting members disposed in the third case section and the first case section, for example, in comparison with the configuration in which the sections are connected using a member provided outside the case, reduction in size of the sensor head can be achieved.

In the aspect, a through-hole configured to bring the inner circumferential surface of the first passage and the outside in communication with each other may be formed in the third case section, and one end side of the connecting member may be fixed to an inside of the first passage when a fastening member inserted through the through-hole abuts an outer circumferential surface thereof.

According to the aspect, since there is a configuration in which the fastening member abuts the outer circumferential surface of the connecting member to be fixed thereto, for example, by adjusting tightening of the fastening member, the third case section can be moved with respect to the connecting member, and an angle of the third case section can be easily adjusted.

According to the embodiments of the disclosure, it is possible to provide a sensor head capable of reduction in size while securing measurement accuracy.

Exemplary embodiments of the disclosure will be described with reference to the accompanying drawings. Further, in the drawings, the same or similar components are designated by the same reference numerals.

Figure 1:
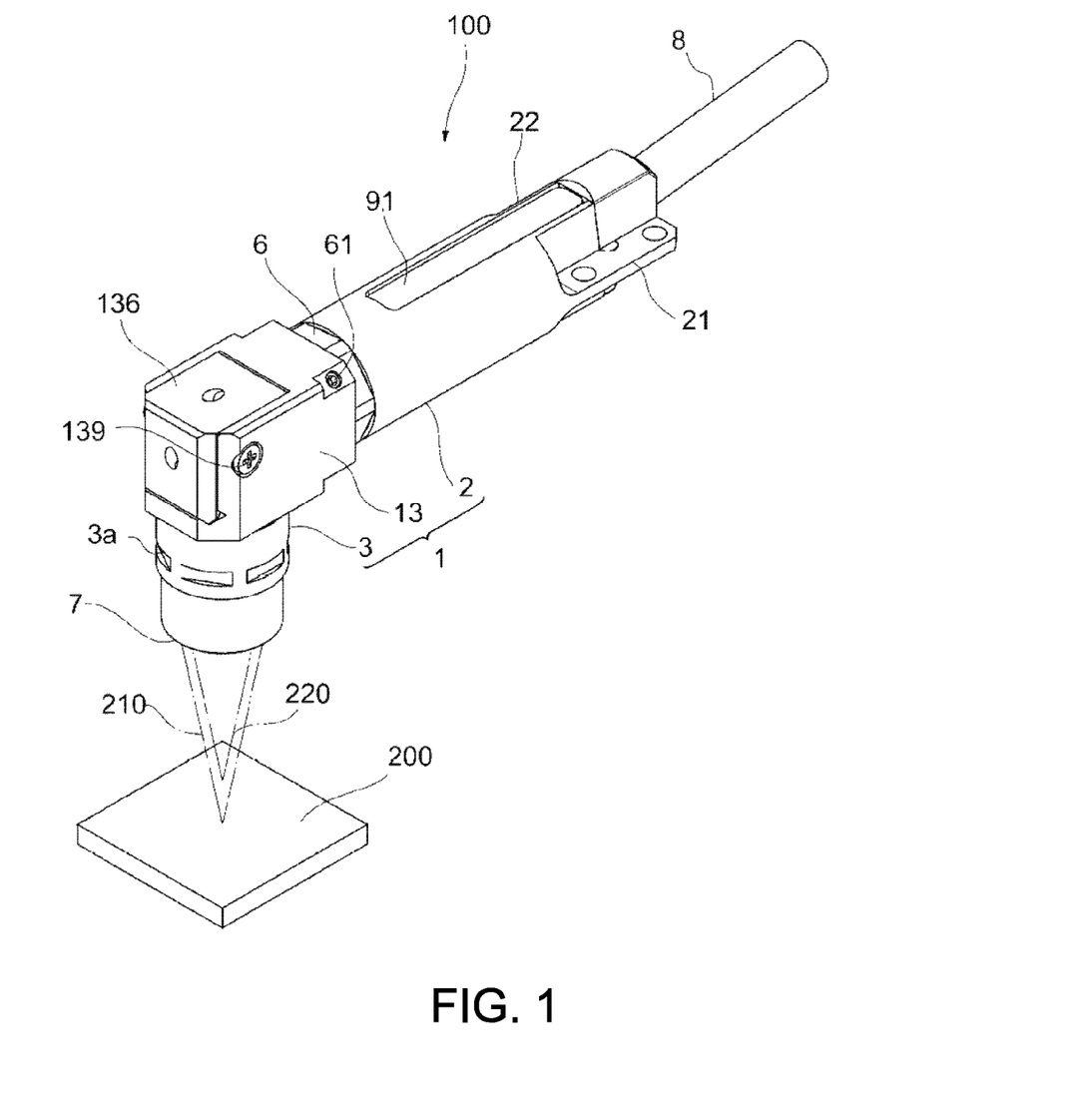
FIG. 1 is a perspective view showing a sensor head according to an embodiment.

FIG. 1 is a perspective view showing a sensor head 100 according to the embodiment. The sensor head 100 constitutes a part of a sensor configured to measure a position of a measurement object 200, and includes a case 1. The case 1 has a first case section 2, a second case section 3 and a third case section 13.

The first case section 2 has a substantially cylindrical shape, and a diffraction lens 5 (see FIG. 2 or the like), which will be described below, is disposed therein. A fiber case 8 is connected to an end portion of the case 1. An optical fiber configured to guide white light emitted from a light source (not shown) to the first case section 2 is disposed in the fiber case 8. The diffraction lens 5 generates chromatic aberration in a direction along the optical axis with respect to the light emitted from the optical fiber.

The second case section 3 has a substantially cylindrical shape, and an objective lens group 7, which will be described below, is disposed therein. The second case section 3 fixes the objective lens group 7 to expose a part of the objective lens group 7.

The third case section 13 has an angled external form, and connects the first case section 2 and the second case section 3. A mirror member 135 (see FIG. 2 or the like), which will be described below, configured to bend an optical axis is disposed in the third case section 13.

The sensor head 100 is used to direct the objective lens group 7 toward the measurement object 200. Light that has passed through the diffraction lens 5 and generated chromatic aberration is refracted and collected by the objective lens group 7 and emitted toward the measurement object 200 side as a direction thereof toward the objective lens group 7 is changed by the mirror member 135. FIG. 1 shows light 210 having a first wavelength with a focal distance that is relatively long, and light 220 having a second wavelength with a focal distance that is relatively short. While the light 210 having a first wavelength is focused on a surface of the measurement object 200, the light 220 having a second wavelength is focused on a side in front of the measurement object 200.

The light reflected by the surface of the measurement object 200 enters the objective lens group 7. The light is collected by the objective lens group 7, the direction thereof is changed to a direction toward the diffraction lens 5 at the mirror member 135, and the light passes through the diffraction lens 5 and advances toward the optical fiber. The light 210 having a first wavelength is focused to the optical fiber, most of which enters the optical fiber. Meanwhile, the light having other wavelengths is not focused to the optical fiber, most of which does not enter the optical fiber.

The light entering the optical fiber is guided to a spectrometer (not shown) connected to the optical fiber. The spectrometer detects a peak of the wavelength of the light, and measures a position of the measurement object 200 on the basis of the peak.

In such a sensor head 100, since the first case section 2 and the second case section 3 having a substantially cylindrical shape are connected via the third case section 13, a large overhang of the first case section 2 or the second case section 3 outward from the lens when seen in the optical axis direction can be curtailed. In addition, while a method using a small lens may be conceived as a method of minimizing an increase in size of a sensor head, when an effective diameter of the lens is reduced according to reduction in size of the lens, a decrease in measurement accuracy may occur. In the embodiment, since the first case section 2 and the second case section 3 having a substantially cylindrical shape are provided, the case 1 can be reduced in size while securing measurement accuracy in comparison with the configuration in which the entire case 1 has a substantially rectangular parallelepiped shape. Further, a method of connecting the first case section 2 and the third case section 13 and connecting the third case section 13 and the second case section 3 will be described in detail.

[Configuration Example]

Figure 2:
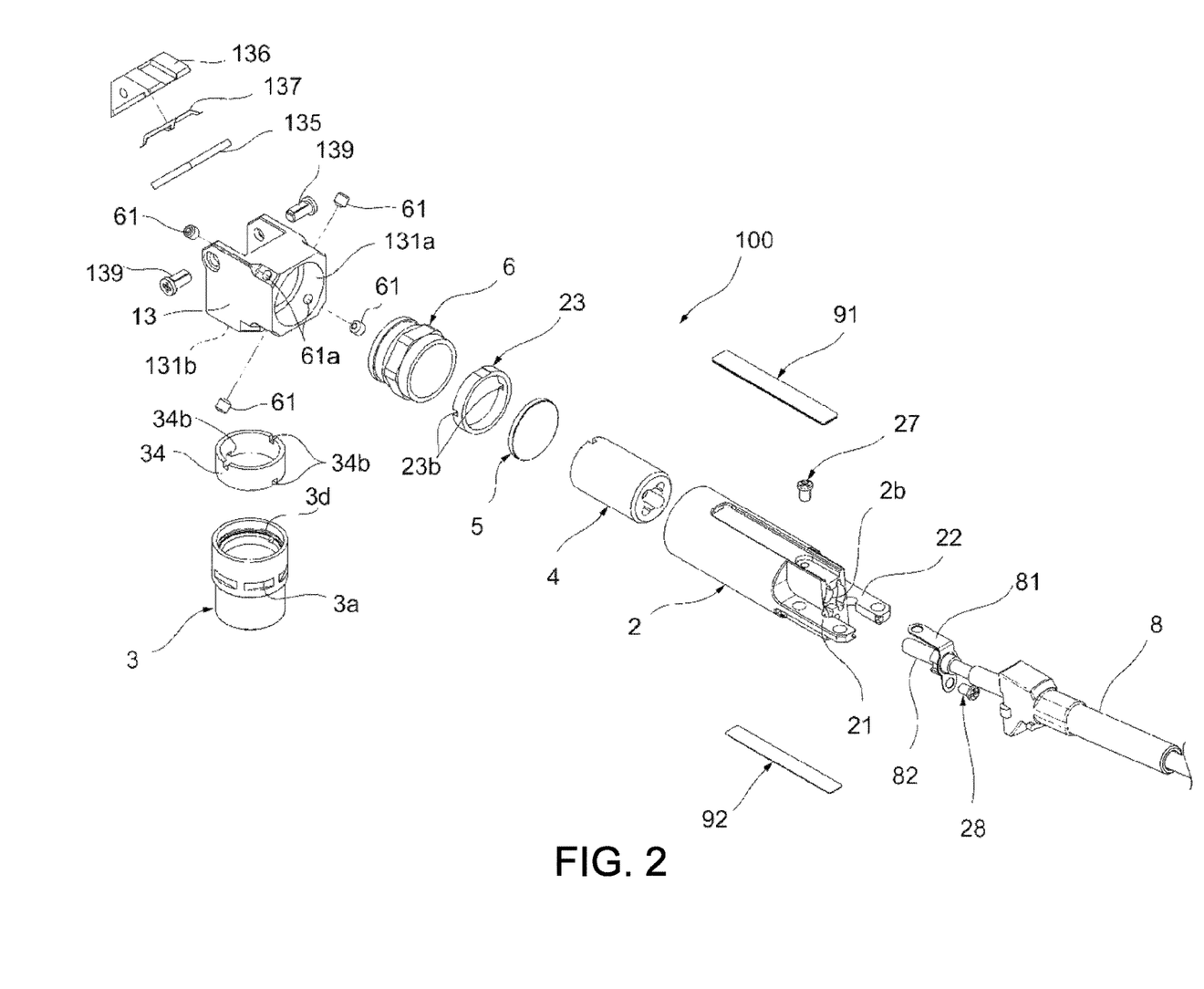
FIG. 2 is an exploded perspective view of a part of the sensor head of FIG. 1.
Figure 3:
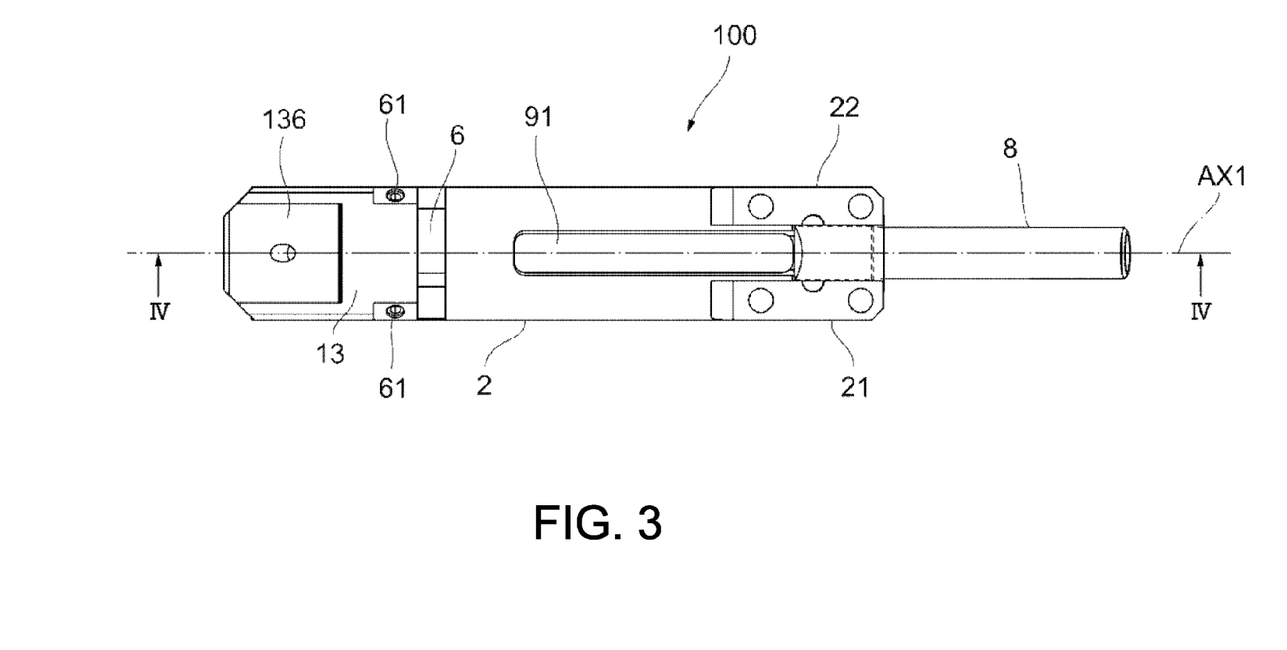
FIG. 3 is a plan view showing the sensor head of FIG. 1.
Figure 4:
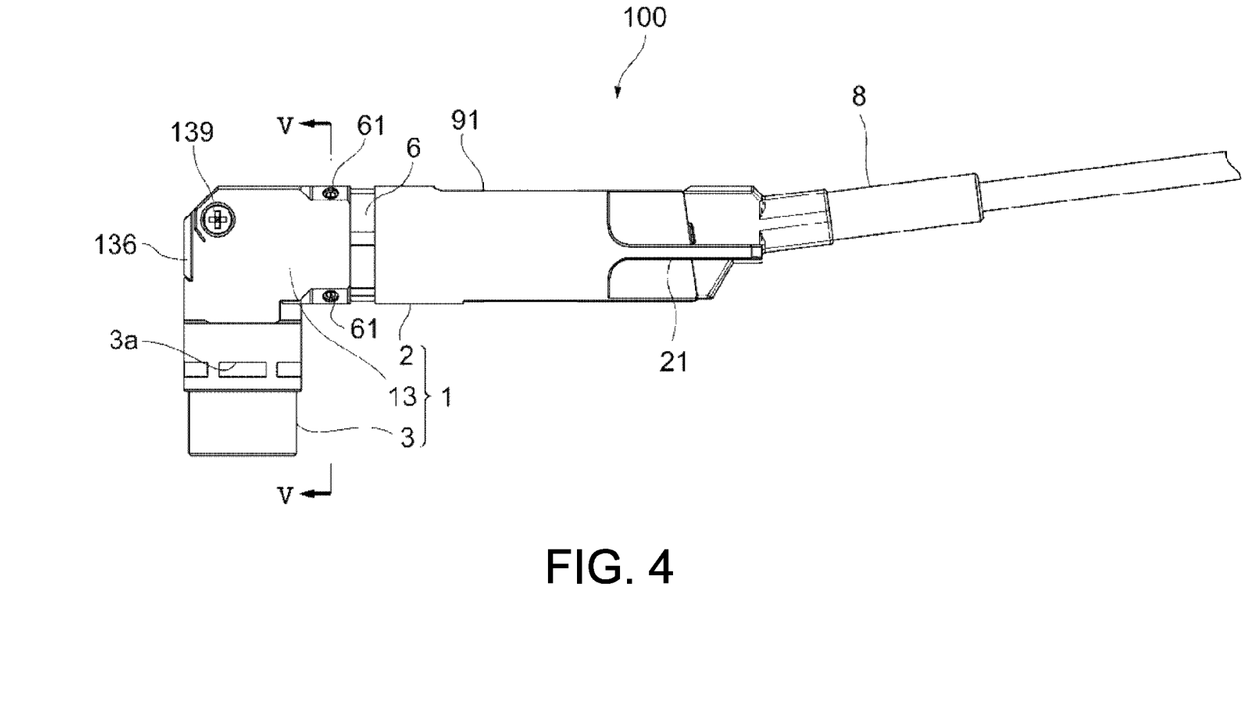
FIG. 4 is a side view showing the sensor head of FIG. 1.
Figure 5:
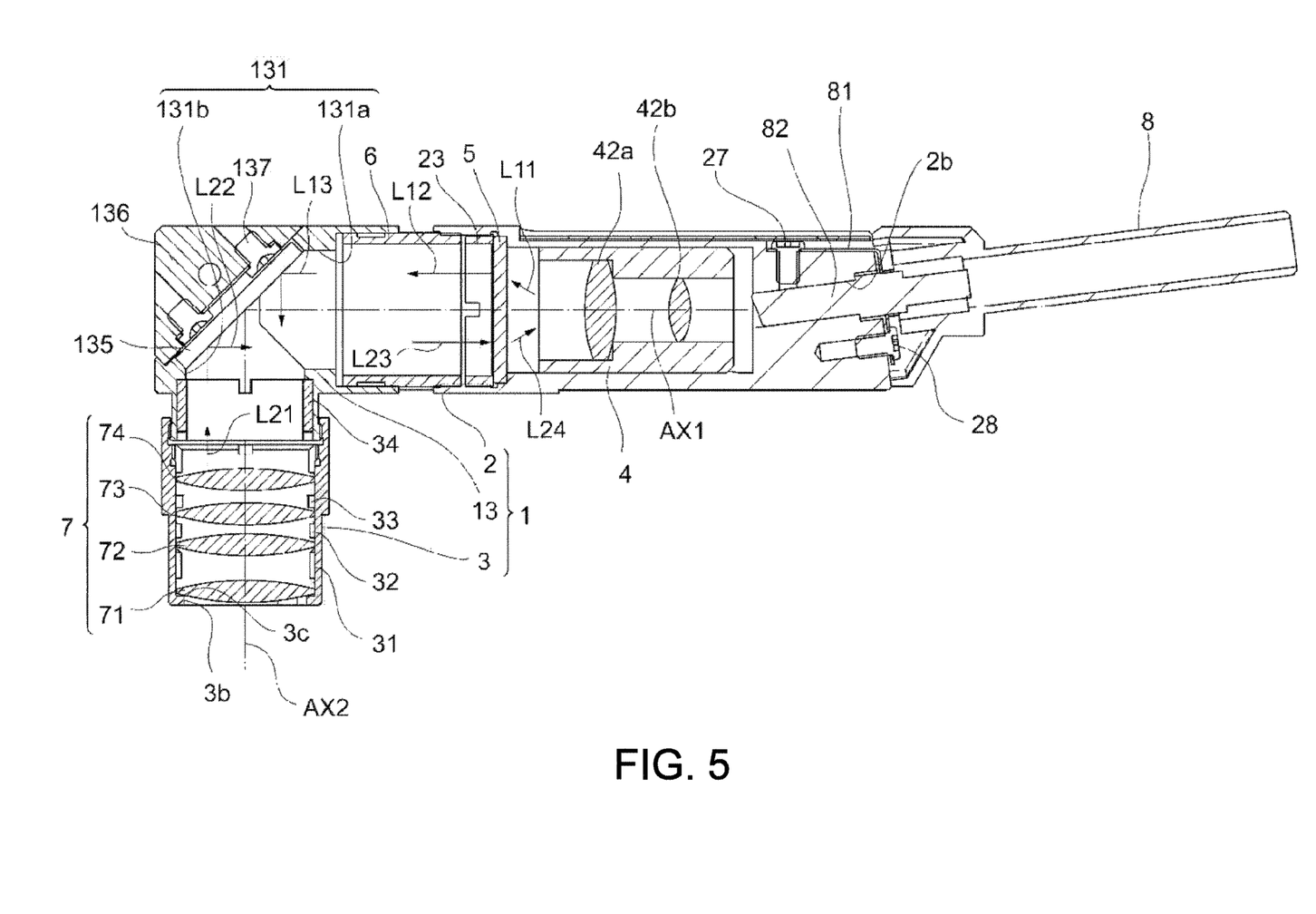
FIG. 5 is a cross-sectional view taken along line IV-IV in FIG. 3.

Next, an example of a configuration of the sensor head 100 will be described with reference to FIG. 2 to FIG. 6. FIG. 2 is a perspective view showing the sensor head 100. FIG. 2 is an exploded view showing a part of the sensor head 100. FIG. 3 is a plan view (a top view) showing the sensor head 100. FIG. 4 is a side view showing the sensor head 100. FIG. 5 is a cross-sectional view taken along line IV-IV in FIG. 3.

<First Case Section>

The first case section 2 has a substantially cylindrical shape, one end of which is open, and a central axis thereof is disposed to substantially coincide with a first axis AX1. The first axis AX1 is a virtual straight line.

As shown in FIG. 2 and FIG. 3, fixing sections 21 and 22 used to fix the sensor head 100 are formed on the other end of the first case section 2. As shown in FIG. 2 and FIG. 4, a communication hole 2b configured to bring the inside and the outside of the first case section 2 in communication with each other is formed between the fixing sections 21 and 22. As shown in FIG. 4, the first case section 2 accommodates a lens holder 4 and the diffraction lens 5 therein.

The lens holder 4 is a member having a substantially cylindrical shape. An inner diameter of the lens holder 4 varies according to areas thereof. A first collimating lens 42a and a second collimating lens 42b are disposed in the lens holder 4.

The first collimating lens 42a is fixed to an inside of the lens holder 4. The second collimating lens 42b is disposed at an interval from the first collimating lens 42a.

The lens holder 4 is accommodated in the first case section 2 as a whole, and fixed to the first case section 2 by a screw (not shown) passing through the first case section 2. Accordingly, both the first collimating lens 42a and the second collimating lens 42b are disposed such that an optical axis thereof substantially coincides with the first axis AX1. The lens holder 4 is movable in a direction along the first axis AX1 (hereinafter, referred to as "a first axis AX1 direction") when a screw (not shown) is loosened. Positions of the first collimating lens 42a and the second collimating lens 42b can be adjusted by moving the lens holder 4.

The diffraction lens 5 is disposed closer to the measurement object 200 side than the lens holder 4 is such that an optical axis thereof substantially coincides with the first axis AX1. The diffraction lens 5 generates chromatic aberration in the first axis AX1 direction with respect to the incident light. A lens having a focal distance that is inversely proportional to a wavelength of light may be employed as the diffraction lens 5.

<Second Case Section>

The second case section 3 is connected to the first case section 2 via the third case section 13. The second case section 3 has a substantially cylindrical shape. One end of the second case section 3 is open, and an opening 3b is formed in the other end. As shown in FIG. 2, a female screw section 3d is formed on an inner circumferential surface of one end side of the second case section 3. The opening 3b has a substantially perfect circular shape when seen along a central axis of the second case section 3. As shown in FIG. 2, a plurality of concave sections 3a are formed in an outer circumferential surface of the second case section 3. A bottom surface of the concave sections 3a is a plane. As shown in FIG. 5, the second case section 3 accommodates the objective lens group 7, spacers 31 to 33 and a pressing member 34 therein.

The objective lens group 7 is an example of "an objective lens" according to the embodiments of the disclosure. The objective lens group 7 has a first objective lens 71, a second objective lens 72, a third objective lens 73 and a fourth objective lens 74. All of the lenses of the objective lens group 7 have a substantially circular shape, and a diameter thereof is substantially equal to an inner diameter of the second case section 3.

Further, "the objective lens" according to the embodiments of the disclosure may be constituted by a plurality of lenses like the objective lens group 7 or may be a single lens.

The spacers 31 to 33 each have a substantially annular shape. An outer diameter of each of the spacers 31 to 33 is substantially equal to an outer diameter of each of the lenses of the objective lens group 7.

The pressing member 34 has a substantially annular shape, and an outer circumferential surface thereof is engaged with and fixed to an inner circumferential surface of the second case section 3. While an engagement method of the pressing member 34 and the second case section 3 is not particularly limited, for example, a male screw section (not shown) formed on an outer circumferential surface of the pressing member 34 and the female screw section 3d formed in the inner circumferential surface of the second case section 3 may be screwed and fixed to each other. In this way, one end side of the pressing member 34 is engaged with and fixed to an inner circumferential surface of the second case section 3, and the other end side of the pressing member 34 is engaged with and fixed to an inner circumferential surface of a second passage section 131b of the third case section 13, which will be described below.

The lenses of the objective lens group 7 are arranged linearly at intervals such that every optical axis substantially coincides with a second axis AX2. Specifically, the first objective lens 71 is disposed to abut a circumferential edge 3c of the opening 3b of the second case section 3 and to be exposed from the opening 3b. The second objective lens 72 is disposed to face the first objective lens 71 with the spacer 31 sandwiched therebetween. The third objective lens 73 is disposed to face the second objective lens 72 with the spacer 32 sandwiched therebetween. The fourth objective lens 74 faces the third objective lens 73 with the spacer 33 sandwiched therebetween, is sandwiched between the spacer 33 and the pressing member 34, and is fixed to an inside of the second case section 3. A male screw section (not shown) of an outer circumferential surface of the pressing member 34 is screwed into the female screw section 3d of the inner circumferential surface of the second case section 3. The lenses of the objective lens group 7 are arranged not to generate wave aberration in the passing light.

<Fiber Case>

As shown in FIG. 2 and FIG. 5, the fiber case 8 is fixed to the first case section 2 via a leaf spring 81. The leaf spring 81 is fixed to an upper section of the first case section 2 by a screw 27, and fixed to an end portion of the first case section 2 by a screw 28. The fiber case 8 accommodates an optical fiber (not shown) therein. A ferrule 82 is connected to a tip of the optical fiber. As shown in FIG. 4, the ferrule 82 is inserted into the communication hole 2b of the first case section 2.

As shown in FIG. 2, an upper label 91 is adhered to an upper section of the first case section 2 to cover the screw 27. In addition, a lower label 92 is adhered to a lower section of the first case section 2 to cover a screw (not shown). A logo such as a product name or the like may be printed on the upper label 91 and the lower label 92.

<Pressing Member and Connecting Member<

As shown in FIG. 2 and FIG. 5, a connecting member 6 and a pressing member 23 each have a substantially annular shape. A plurality of notches 23b are formed in an end portion of the pressing member 23. An outer diameter of the pressing member 23 is substantially the same as that of the connecting member 6, and an inner diameter of the pressing member 23 is substantially the same as that of the connecting member 6. In addition, a dimension of the pressing member 23 in the direction along the central axis is smaller than that of the connecting member 6 in the same direction.

The engagement method of the outer circumferential surface of the pressing member 23 and the inner circumferential surface of the first case section 2 is not particularly limited, but for example, a male screw section (not shown) formed on an outer circumferential surface of the pressing member 23 may be screwed into a female screw section of the first case section 2. An operator can transmit a torque from a tool (not shown) to the pressing member 23 and screw the male screw section formed in the outer circumferential surface of the pressing member 23 by engaging the tool with the notches 23b. Accordingly, the pressing member 23 is disposed in the first case section 2 on the measurement object 200 side of the diffraction lens 5 such that a central axis thereof substantially coincides with the first axis AX1.

When the pressing member 23 is disposed in the first case section 2, the diffraction lens 5 is pressed toward the light source side by the pressing member 23. The diffraction lens 5 is sandwiched between the pressing member 23 and a stepped section 25 of the first case section 2 and fixed to an inside of the first case section 2.

The engagement method of the outer circumferential surface of the connecting member 6 and the inner circumferential surface of the first case section 2 is not particularly limited, for example, the male screw section (not shown) formed on the outer circumferential surface of the connecting member 6 may be screwed into the female screw section of the first case section 2. The connecting member 6 engaged with the inner circumferential surface of the first case section 2 is exposed to the outside from the one end of the first case section 2. The third case section 13 is connected and fixed to a portion of the connecting member 6 exposed to the outside from the one end of the first case section 2. That is, the third case section 13 is connected to the first case section 2 via the connecting member 6. A portion of the first case section 2 side of the third case section 13 is connected to the first case section 2 such that a central axis thereof substantially coincides with the first axis AX1.

<Third Case Section>

The third case section 13 is disposed between the first case section 2 and the second case section 3, and connects the first case section 2 and the second case section 3. The third case section 13 has an angled external form, which is an angled shape, and a bent shape. As shown in FIG. 4, the sensor head 100 in the embodiment has substantially an L shape bent at the third case section 13 when seen in a side view.

The third case section 13 has a shape in which an end portion of the first case section 2 side and an end portion of the second case section 3 side are open. In addition, the third case section 13 has a shape in which an outer side of the bent section (a left upper end side of the third case section 13 in FIG. 4) is open. The mirror member 135, a cover member 136, and so on, which will be described below, are disposed in an opening portion of the bent section of the third case section 13.

As shown in FIG. 5, a communication path 131 communicating with the inside of the first case section 2 and the inside of the second case section 3 is formed in the third case section 13. The communication path 131 connects an opening section of the third case section 13 that opens on the first case section 2 side and an opening section of the third case section 13 that opens on the second case section 3 side. The communication path 131 has a bent shape. In the embodiment, while the communication path 131 has a shape bent at 90 degrees, the angle is not limited to 90 degrees and may be other than 90 degrees. The communication path 131 has a first passage section 131a having a substantially cylindrical shape extending along the first axis AX1 direction, and the second passage section 131b having a substantially cylindrical shape along the second axis AX2 direction.

As shown in FIG. 2 and FIG. 5, the connecting member 6 is connected to the first case section 2 side of the first passage section 131a. An inner diameter of the first passage section 131a is larger than an outer diameter of the connecting member 6. One end side of the connecting member 6 is accommodated in the first passage section 131a, and the other end side of the connecting member 6 is fixed while being accommodated in the first case section 2. That is, the third case section 13 on the side of the first passage section 131a is fixed to the first case section 2 via the connecting member 6. A fixing method of the third case section 13 on the side of the first passage section 131a and the connecting member 6 will be described in detail.

As shown in FIG. 2 and FIG. 5, the pressing member 34 is connected to the second case section 3 side of the second passage section 131b. A plurality of notches 34b (FIG. 2) are formed in the end portion of the pressing member 34. An inner diameter of the second passage section 131b is larger than an outer diameter of the pressing member 34. One end side of the pressing member 34 is disposed in the second passage section 131b, and the other end side of the pressing member 34 is fixed while being disposed in the second case section 3. That is, the third case section 13 on the side of the second passage section 131b is fixed to the second case section 3 via the pressing member 34.

Further, while the engagement method of the second passage section 131b and the pressing member 34 is not particularly limited, for example, a male screw section (not shown) formed on an outer circumferential surface of the pressing member 34 may be screwed into a female screw section formed in an inner circumferential surface of the second passage section 131b (FIG. 5) of the third case section 13. An operator can transmit a torque from a tool (not shown) to the pressing member 34 and screw the male screw section formed in the outer circumferential surface of the pressing member 34 by engaging the tool with the notches 34b (FIG. 2). The pressing member 34 engaged with the inner circumferential surface of the second passage section 131b is exposed to the outside from one end of the third case section 13 (one end of the second passage section 131b). The second case section 3 is connected to a portion of the pressing member 34 exposed to the outside from the one end of the third case section 13.

As shown in FIG. 2, the third case section 13 opens at an outer side of a bent section of the communication path 131 (a left upper end side of the third case section 13 in FIG. 4), and the mirror member 135 is disposed in the opening section. The mirror member 135 bends an optical axis. The mirror member 135 has a plate shape. As shown in FIG. 5, the mirror member 135 is disposed to be inclined with respect to the first axis AX1 direction and the second axis AX2 direction. In the embodiment, the mirror member 135 bends an optical axis in the first axis AX1 direction to an optical axis in the second axis AX2 direction. That is, the mirror member 135 bends light entering from the diffraction lens 5 side toward the objective lens group 7 side at a substantially right angle and bends light entering from the measurement object 200 side toward the diffraction lens 5 side at a substantially right angle. In the embodiment, the first axis AX1 direction is perpendicular to the second axis AX2 direction. However, an angle between the first axis AX1 direction and the second axis AX2 direction is not limited to 90 degrees and may be an angle other than 90 degrees.

As shown in FIG. 2 and FIG. 5, the cover member 136 is disposed to cover the mirror member 135. The cover member 136 has a triangular shape when seen in a side view. While an elastic member 137 is disposed between the mirror member 135 and the cover member 136 and the cover member 136 is fixed to an outer circumferential side of a bent section of the third case section 13 by, for example, a screw 139, the elastic member 137 may be fixed using another member. The elastic member 137 holds the mirror member 135 while pressing the mirror member 135. Since the elastic member 137 is disposed between the mirror member 135 and the cover member 136, when the cover member 136 is fixed by the screw 139, the mirror member 135 is fixed while being pressed by the elastic member 137.

Since the cover member 136 having a triangular shape when seen in a side view as described above is disposed on the bent section of the third case section 13, as shown in FIG. 3, a tip side of the sensor head 100 (the third case section 13 side) has a substantially rectangular parallelepiped shape. Since the tip side of the sensor head 100 has a substantially rectangular parallelepiped shape, in comparison with the configuration in which the entire sensor head has a substantially cylindrical shape, positioning can be facilitated. In addition, in the embodiment, as shown in FIG. 1 to FIG. 4, since the third case section 13 has an angled external form, positional adjustment of the mirror member 135 disposed in the third case section 13 can be easily performed.

Figure 6:
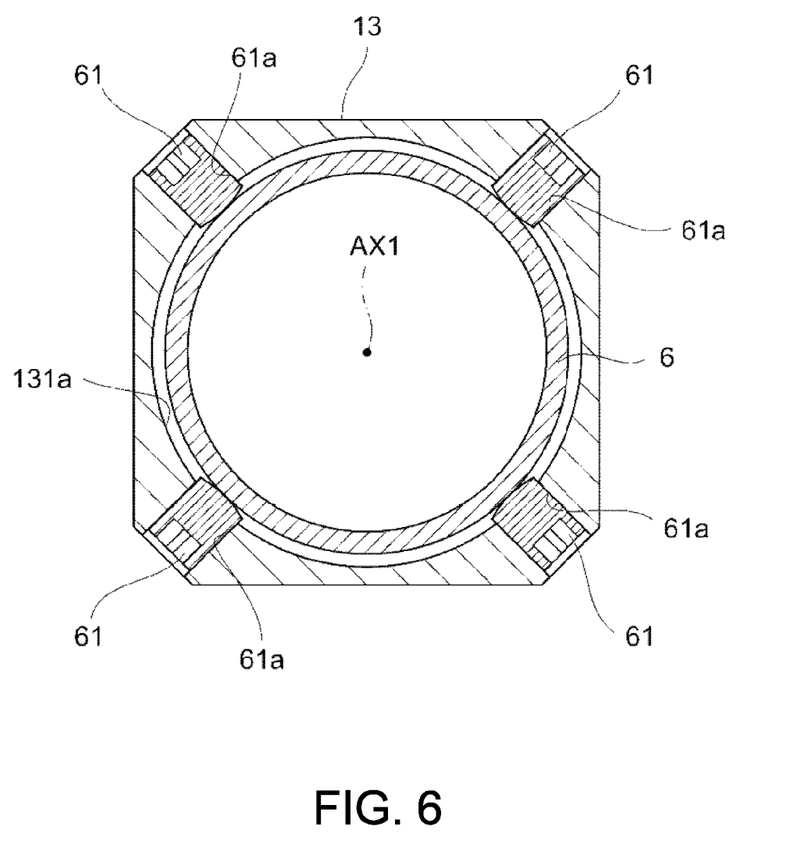
FIG. 6 is a cross-sectional view taken along line V-V in FIG. 4.

The third case section 13 is connected to one end side of the connecting member 6 as described below. FIG. 6 is a cross-sectional view taken along line V-V in FIG. 4.

As shown in FIG. 6, the first case section 2 side of the third case section 13 has a substantially quadrangular external form when seen in a cross-sectional view, and through-holes 61a through which fastening members 61 (for example, screws or the like) are inserted are formed in four corners of the third case section 13. The through-holes 61a are formed to pass through the third case section 13 to bring the inner circumferential surface of the first passage section 131a and the outside in communication with each other. When the fastening members 61 inserted through the through-holes 61a are tightened, the tips of the fastening members 61 are configured to abut the outer circumferential surface of the connecting member 6, one end side of which is disposed in the first passage section 131a. That is, a thrusting force of the fastening members 61 to the connecting member 6 can be adjusted by adjusting tightening of the fastening members 61, and the third case section 13 can be moved with respect to the connecting member 6 when the fastening members 61 are loosened. For example, when the tightening of the fastening members 61 is loosened and the third case section 13 is pivoted with respect to the connecting member 6 in a circumferential direction of the connecting member 6, the second case section 3 connected to the third case section 13 is also pivoted in a linked manner, and a direction of light emitted toward the measurement object 200 (FIG. 1) can be adjusted.

Further, the fastening members 61 can be modified into various configurations as long as a function of adjusting a pressing force to the connecting member 6 is provided. For example, a configuration of adjusting tightening of the fastening members 61 by forming male screw sections (not shown) on the outer circumferential surfaces of the fastening members 61 and screwing the male screw sections into the female screw sections (not shown) formed in the inner circumferential surface of the through-holes 61a can be provided.

While the configuration in which the third case section 13 and the second case section 3 are connected via the pressing member 34 has been described in the above-mentioned embodiment, a configuration in which the third case section 13 and the second case section 3 are connected by adding another member other than the pressing member 34 may be provided.

[Operation Example]

White light emitted from the light source is guided toward the sensor head 100 by the optical fiber and reaches the ferrule 82. The light advances into the case 1 from the ferrule 82 while being diffused.

A part of the light entering the case 1 advances into the lens holder 4. The light passes through the second collimating lens 42b and the first collimating lens 42a in sequence.

The first collimating lens 42a and the second collimating lens 42b change an advance direction of the light entering from the light source side and emit the light toward the measurement object 200 side. Specifically, as shown by an arrow L11 in FIG. 5, the light emitted from the first collimating lens 42a toward the diffraction lens 5 advances along the first axis AX1.

The diffraction lens 5 generates chromatic aberration in the light entering from the first collimating lens 42a side and emits the light along the first axis AX1 as shown by an arrow L12. The light emitted along the first axis AX1 has an optical axis bent in a direction along the second axis AX2 by the mirror member 135 (an arrow L13 shown in FIG. 5), is refracted and collected by the objective lens group 7, and passes through the opening 3b of the second case section 3 to emit toward the measurement object 200.

The light reflected by the surface of the measurement object 200 passes through the opening 3b of the second case section 3 and enters the objective lens group 7. The objective lens group 7 refracts the entering light and emits toward the mirror member 135 along the second axis AX2 as shown by an arrow L21. The light from the objective lens group 7 toward the mirror member 135 has an optical axis bent in a direction along the first axis AX1 by the mirror member 135 (an arrow L22 shown in FIG. 5) toward the diffraction lens 5 side (an arrow L23 shown in FIG. 5). The diffraction lens 5 allows the light entering from the measurement object 200 side to pass therethrough and emits the light toward the light source side along an arrow L24. The first collimating lens 42a and the second collimating lens 42b collects the light entering from the measurement object 200 side and emits the light toward the light source side.

In the sensor head 100, since the first case section 2 and the second case section 3 having a substantially cylindrical shape are connected via the third case section 13, when seen in the first axis AX1 direction and the second axis AX2 direction, it is possible to suppress excessive overhanging outward from the lens (the diffraction lens 5, the objective lens group 7) disposed in the first case section 2 and the second case section 3. As a result, the case 1 can be reduced in size while securing measurement accuracy.

In addition, the connecting member 6 is disposed between the diffraction lens 5 and the third case section 13. At this position, the light advances along the first axis AX1 that is also an optical axis. Accordingly, according to the configuration, in comparison with the case in which the connecting member 6 is disposed at a position at which the light advances to be inclined with respect to the first axis AX1, an influence of a variation generated in the dimension of the case 1 can be reduced, and a decrease in measurement accuracy can be minimized.

Incidentally, when the third case section 13 and the first case section 2 are connected via the connecting member 6, an external force in the first axis AX1 direction is applied to the connecting member 6. Provisionally, when the connecting member 6 also has a function of pressing and fixing the diffraction lens 5, fixing of the diffraction lens 5 may become unstable by applying such as an external force.

On the other hand, in the sensor head 100, the pressing member 23 configured to press and fix the diffraction lens 5 toward the light source side is disposed between the connecting member 6 and the diffraction lens 5 separately from the connecting member 6. Accordingly, provisionally, even when an external force in the first axis AX1 direction is applied to the connecting member 6, the external force will not be exerted to the pressing member 23. As a result, the first case section 2 and the third case section 13 can be connected via the connecting member 6 while stably fixing the diffraction lens 5.

In addition, in the first axis AX1 direction, a dimension of the pressing member 23 is smaller than that of the connecting member 6. According to the aspect, since the dimension of the pressing member 23 is relatively small, the dimension of the connecting member 6 is relatively large, and the first case section 2 and the second case section 3 can be securely connected.

In addition, the second case section 3 has the concave sections 3a formed on the outer circumferential surface thereof, and a bottom surface of the concave sections 3a is a plane. According to the aspect, when the sensor head 100 is assembled, a tool can stably abut the bottom surface of the concave sections 3a, and a torque can be transmitted to the second case section 3 in which the concave sections 3a is formed. As a result, assembly of the sensor head 100 can be easily performed by applying a torque while using the first case section 2 and the second case section 3 having a substantially cylindrical shape for the case 1.

Further, in the sensor head 100, "the concave section" according to the embodiments of the disclosure is formed in the second case section 3 only. However, the embodiments of the disclosure are not limited to the aspect. That is, "the concave section" according to the embodiments of the disclosure may be formed in at least one of the first case section 2 and the second case section 3.

The above-mentioned embodiments are intended to facilitate understanding of the disclosure and not to limitedly interpret the disclosure. Components provided in the embodiments and their arrangements, materials, conditions, shapes, sizes, and so on, are not limited to those exemplified and can be appropriately changed. In addition, components shown in different embodiments can be partially replaced or combined.

[Supplementary Statement]

A sensor head (100) of a sensor configured to measure a position of a measurement object (200), the sensor head (100) including:

a diffraction lens (5) configured to emit light entering from a light source side along an optical axis (AX1) and generate chromatic aberration with respect to the light;

an objective lens (7) disposed closer to the measurement object (200) than the diffraction lens (5) is, and configured to collect light entering from the diffraction lens (5) side to emit the light toward the measurement object (200) and emit the light entering from the measurement object (200) side toward the diffraction lens (5); and a case (1) having a space formed therein and configured to accommodate at least the diffraction lens (5) and the objective lens (7) in the space, wherein the case (1) has a first case section (2) having a substantially cylindrical shape about the optical axis (AX1) as a central axis and an end portion of which is open, a second case section (3) having a substantially cylindrical shape and an end portion of which is open, and a third case section (13) connected between the first case section (2) and the second case section (3), the first case section (2) has the diffraction lens (5) disposed therein, the second case section (3) has the objective lens (7) disposed therein, and the third case section (13) has a mirror member (135) disposed therein and configured to bend light entering from the diffraction lens (5) side toward the objective lens (7).

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A sensor head of a sensor configured to measure a position of a measurement object, the sensor head comprising:
   a diffraction lens configured to emit light entering from a light source side along an optical axis and generate chromatic aberration with respect to the light;
   an objective lens disposed closer to the measurement object side than the diffraction lens is, and configured to collect light entering from the diffraction lens side to emit the light toward the measurement object side and emit the light entering from the measurement object side toward the diffraction lens side; and
   a case having a space formed therein and configured to accommodate at least the diffraction lens and the objective lens in the space,
   wherein the case has a first case section having a substantially cylindrical external shape about the optical axis as a central axis and an end portion of which is open, a second case section having a substantially cylindrical external shape and an end portion of which is open, and a third case section connected between the first case section and the second case section,
   the first case section has the diffraction lens disposed therein,
   the second case section has the objective lens disposed therein, and
   the third case section has a mirror member disposed therein and configured to bend light entering from the diffraction lens side toward the objective lens side,
   wherein the third case section has a first passage disposed in the first case section side and having a substantially cylindrical shape about an optical axis of the first case section as a central axis, and
   a connecting member configured to connect one end portion of the first passage and one end portion of the first case section is provided,
   wherein the connecting member has a substantially annular shape, and
   one end side of the connecting member is disposed along an inner circumferential surface of the first passage, and the other end side of the connecting member is disposed along an inner circumferential surface of the first case section.

2. The sensor head according to claim 1, wherein the third case section has a communication path having a shape bent therein, and
   the communication path brings the inside of the first case section and the inside of the second case section in communication with each other.

3. The sensor head according to claim 1, wherein a through-hole configured to bring the inner circumferential surface of the first passage and the outside in communication with each other is formed in the third case section, and
   one end side of the connecting member is fixed to an inside of the first passage as a fastening member inserted through the through-hole abuts an outer circumferential surface thereof.

4. The sensor head according to claim 1, wherein the third case section has an angled external form.

5. The sensor head according to claim 4, wherein the third case section has a communication path having a shape bent therein, and
   the communication path brings the inside of the first case section and the inside of the second case section in communication with each other.

6. The sensor head according to claim 1, wherein the mirror member bends light entering from the diffraction lens side toward the objective lens side at a substantially right angle, and bends light entering from the measurement object side toward the diffraction lens side at a substantially right angle.

7. The sensor head according to claim 6, wherein the third case section has an angled external form.

8. The sensor head according to claim 6, wherein the third case section has a communication path having a shape bent therein, and
   the communication path brings the inside of the first case section and the inside of the second case section in communication with each other.

9. The sensor head according to claim 7, wherein the third case section has a communication path having a shape bent therein, and
   the communication path brings the inside of the first case section and the inside of the second case section in communication with each other.

* * * * *